US009803592B2

(12) United States Patent
Pursifull et al.

(10) Patent No.: US 9,803,592 B2
(45) Date of Patent: Oct. 31, 2017

(54) FUEL VAPOR BLOCKING VALVE CONTROL

(71) Applicant: Ford Global Technologies, LLC, Dearborn, MI (US)

(72) Inventors: Ross Dykstra Pursifull, Dearborn, MI (US); Mark W. Peters, Wolverine Lake, MI (US); Brian Thomas Aitken, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 239 days.

(21) Appl. No.: 14/730,033

(22) Filed: Jun. 3, 2015

(65) Prior Publication Data

US 2016/0355390 A1 Dec. 8, 2016

(51) Int. Cl.
*F02M 25/08* (2006.01)
*F16K 31/02* (2006.01)
*G05B 15/02* (2006.01)
*F02D 41/00* (2006.01)
*B60K 15/035* (2006.01)
*B60K 15/03* (2006.01)
*F02B 37/16* (2006.01)
*F02B 37/12* (2006.01)

(52) U.S. Cl.
CPC ... *F02M 25/0836* (2013.01); *B60K 15/03519* (2013.01); *F02D 41/004* (2013.01); *F02M 25/08* (2013.01); *F02M 25/089* (2013.01); *F02M 25/0827* (2013.01); *F02M 25/0872* (2013.01); *F16K 31/02* (2013.01); *G05B 15/02* (2013.01); *B60K 2015/0321* (2013.01); *B60K 2015/03302* (2013.01); *F02B 37/127* (2013.01); *F02B 37/16* (2013.01); *F02B 2037/162* (2013.01)

(58) Field of Classification Search
CPC .............. F02M 25/08; F02M 25/0827; F02M 25/0872; F02M 25/0836; F02M 25/0845; F02D 41/004
USPC ...................... 123/518, 519, 520, 516, 198 D
See application file for complete search history.

(56) References Cited

U.S. PATENT DOCUMENTS

| 6,276,193 | B1 | 8/2001 | Benjey |
| 6,412,335 | B1 | 7/2002 | Detweiler et al. |
| 6,553,975 | B2 | 4/2003 | Weldon et al. |
| 8,132,548 | B2 | 3/2012 | Ervin et al. |
| 2001/0008136 | A1* | 7/2001 | Kitamura ........... F02M 25/0809 123/516 |

(Continued)

OTHER PUBLICATIONS

Pursifull, R. "Systems and Methods for Compressor Clutch Control," U.S. Appl. No. 14/801,256, filed Jul. 16, 2015, 49 pages.

(Continued)

*Primary Examiner* — Mahmoud Gimie
(74) *Attorney, Agent, or Firm* — Julia Voutyras; McCoy Russell LLP

(57) ABSTRACT

Methods and systems for controlling and reducing current consumption of a vapor blocking valve are disclosed. In one example, current supplied to the vapor blocking valve is adjusted proportionately to fuel tank pressure to compensate for fuel tank pressure acting on the vapor blocking valve. Vapor blocking valve current is adjusted to reduce current consumption.

19 Claims, 4 Drawing Sheets

(56) References Cited

U.S. PATENT DOCUMENTS

| | | | |
|---|---|---|---|
| 2002/0078932 A1* | 6/2002 | Weldon | F02M 25/0836 123/520 |
| 2002/0112702 A1* | 8/2002 | Weldon | F16K 31/0655 123/520 |
| 2009/0078239 A1* | 3/2009 | Hill | B60K 15/035 123/521 |
| 2013/0164648 A1 | 6/2013 | Asano et al. | |
| 2014/0060661 A1 | 3/2014 | Miura et al. | |

OTHER PUBLICATIONS

Anonymous, "An EVAP System With Energy Saving Latchable Valves," IPCOM No. 000237278D, published Jun. 11, 2014, 2 pages.

* cited by examiner

FUEL VAPOR BLOCKING VALVE CONTROL

BACKGROUND/SUMMARY

A vehicle fuel system may include a fuel tank and a carbon canister to process fuel vapors that may be emitted from the fuel tank. A fuel vapor blocking valve may be installed in a passage or conduit that pneumatically couples the fuel tank to the carbon canister and ultimately to the engine air duct, to be ingested and combusted. The fuel vapor blocking valve may be opened to allow fuel vapors to flow from the fuel tank to the carbon canister and on to the engine intake. The fuel vapor blocking valve may be closed during select vehicle operating conditions to prevent vapors from flowing from the fuel tank to the carbon canister. By blocking fuel vapors flowing to the carbon canister, it may be possible to purge the carbon canister of fuel vapors without fuel vapors flowing from the fuel tank disturbing the engine air-fuel ratio. A fuel vapor blocking valve may be configured as a solenoid valve and it may be held normally open via a return spring. The fuel vapor valve may be closed via electrical current passing through the solenoid. However, supplying electrical current to the vapor blocking valve can decrease vehicle fuel economy by consuming charge produced via an alternator. Therefore, it would be desirable to improve vehicle fuel economy via reducing electrical current supplied to the vapor blocking valve.

The inventors herein have recognized the above-mentioned disadvantages and have developed a vapor blocking valve control method, comprising: receiving sensor input to a controller; proportionately adjusting a vapor blocking valve holding current command for a closed vapor blocking valve based on a fuel tank pressure via the controller; and supplying electrical current to a vapor blocking valve in response to the vapor blocking valve current command.

By proportionately adjusting vapor blocking valve electrical current for a closed vapor blocking valve based on fuel tank pressure, it may be possible to provide the technical result of reducing vapor blocking valve electrical current consumption. Pressure within a fuel tank may exert a force on a vapor blocking valve to open or hold closed the vapor blocking valve. Therefore, fuel tank pressure may be a basis for adjusting electrical current supplied to a closed or commanded closed vapor blocking valve. For example, for the case where fuel tank pressure tends to open the VBV, if fuel tank pressure is positive and high, electrical current supplied to the vapor blocking valve may be proportionately increased to keep the vapor blocking valve closed. On the other hand, if fuel tank pressure is negative relative to atmospheric pressure, vapor blocking valve electrical current may be reduced. Reducing vapor blocking valve electrical current may improve vehicle fuel economy by reducing a load an alternator applies to an engine to supply electrical power to the vapor blocking valve.

The present description may provide several advantages. Specifically, the approach may reduce vehicle fuel consumption. Additionally, the approach may reduce system cost by utilizing existing fuel vapor system components. Further, the approach may reduce system complexity by reducing controller electrical connections.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
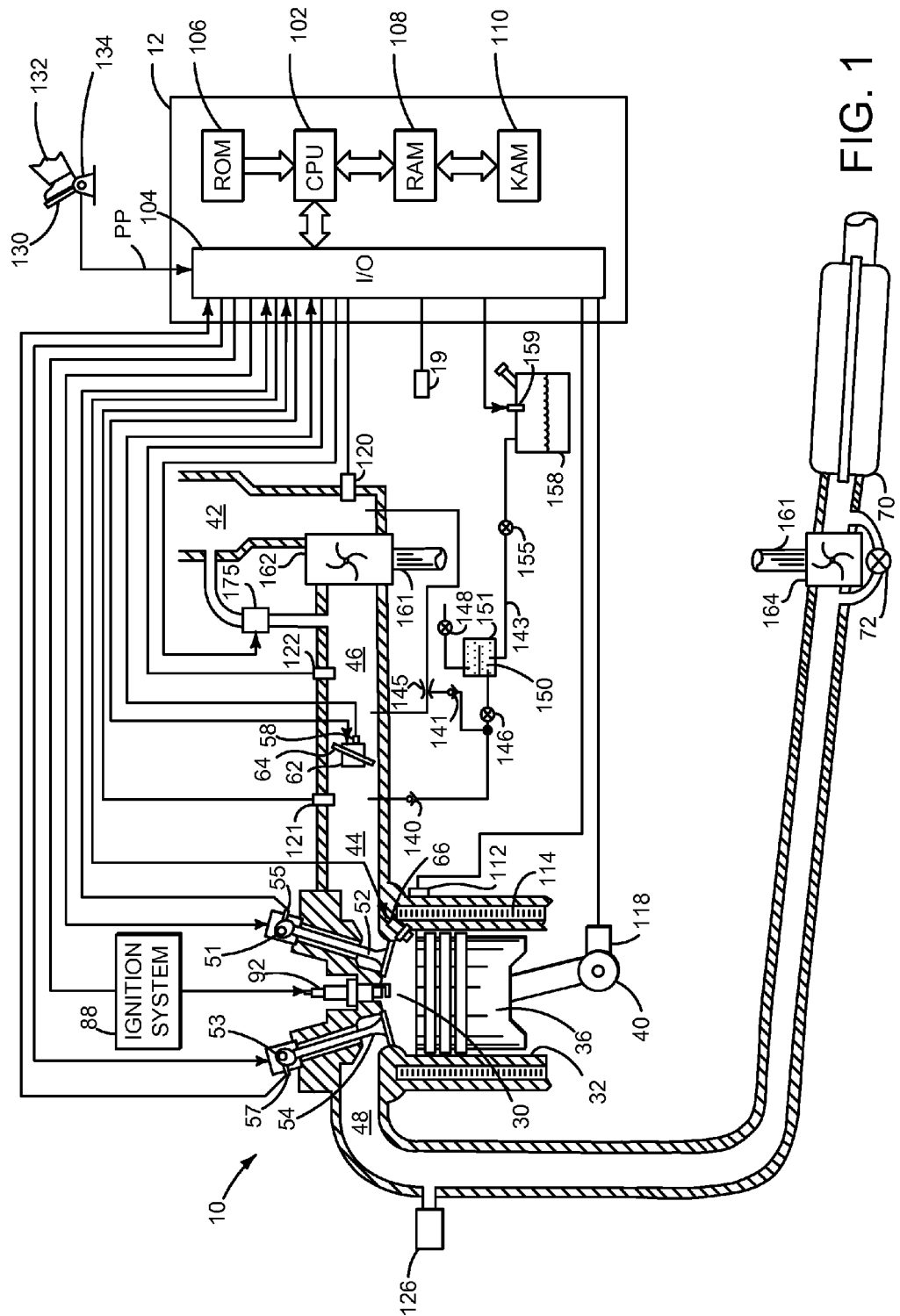
FIG. 1 shows a schematic depiction of an engine including a vapor management system.

The present description is related to operating a vapor blocking valve of a fuel vapor management system. The vapor blocking valve may selectively allow or prevent flow of fuel vapors from a fuel tank to a fuel vapor storage canister. FIG. 1 shows an example engine including a fuel vapor management system. The vapor blocking valve may be supplied electrical current based on the transfer function shown in FIG. 2A. In some examples, the vapor blocking valve may include a poppet valve as shown in FIG. 2B. The vapor blocking valve may be operated according to the sequence shown in FIG. 3. A method for operating the vapor blocking valve shown in FIG. 1 is provided in FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width provided from controller 12. Fuel is delivered to fuel injector 66 by a fuel system including a fuel tank 158, fuel pump (not shown), and fuel rail (not shown). In addition, intake manifold 44 is shown communicating with optional electronic throttle 62 which adjusts a position of throttle plate 64 to control air flow from intake boost chamber 46.

Compressor 162 draws air from air intake passage 42 to supply boost chamber 46. Exhaust gases spin turbine 164 which is coupled to compressor 162 via shaft 161. Compressor bypass valve 175 may be electrically operated via a signal from controller 12. Compressor bypass valve 175 allows pressurized air to be circulated back to the compressor inlet to limit boost pressure. Similarly, waste gate actuator 72 allows exhaust gases to bypass turbine 164 so that boost pressure can be controlled under varying operating conditions.

Fuel vapors from fuel tank 158 may be directed to canister 151 which holds activated carbon 150 for storing fuel vapors. Vapor blocking valve 155 is located along passage or conduit 143 and it selectively allows fuel vapors to flow from fuel tank 158 to canister 151. Canister vent solenoid 148 selectively allows air that has been stripped of fuel vapors to exit to atmosphere from canister 151. Canister purge valve 146 selectively allows fuel vapors from canister 151 to enter intake manifold 44 or air intake passage 42. Check valves 140 and 141 prevent air from passing from engine 10 to canister 151. Venturi 145 provides vacuum to draw fuel vapors from canister 151 to engine 10 when intake manifold pressure is greater than atmospheric pressure. Fuel tank pressure may be determined via pressure sensor 159. Alternatively, fuel tank pressure may be inferred based on ambient temperature and other conditions.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; atmospheric pressure from barometric pressure sensor 19; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for a fuel vapor purging system, comprising: a fuel vapor storage canister including activated carbon; a fuel tank; a vapor blocking valve positioned along a passage between the fuel tank and the fuel vapor storage canister; and a controller including non-transitory instructions for proportionately adjusting current supplied to the vapor blocking valve based on fuel tank pressure when the vapor blocking valve is commanded closed. The system further comprises additional instructions to determine a vapor blocking valve is open responsive to output of filters having different time constants.

In some examples, the system further comprises additional instructions to determine a vapor blocking valve is open based on a rate of fuel tank pressure change greater than a threshold rate of change. The system further comprises additional instructions to reduce vapor blocking valve current in response to no indication of an open vapor blocking valve after a predetermined time since commanding the vapor blocking valve closed. The system further comprises additional instructions to determine the vapor blocking valve is open in response to a fuel tank pressure being within a threshold pressure of atmospheric pressure. The system further comprises additional instructions to adapt a vapor blocking valve transfer function.

Solenoid valve designs are based on balance of forces. The electrical force is directly proportional to electrical current. However, a duty cycle voltage may be applied to the solenoid to provide an effective voltage. The current depends on the solenoid coil resistance (which varies in direct proportion to absolute temperature.) The solenoid position then depends on the default position spring force, the stiction force, the magnetic force (resulting from electrical current), and the fluid pressure differential across the valve. Of course, most of these are subject variation with manufacturing, aging, and conditions. One approach is to simply compute the worst case scenario and apply the requisite current. However, this results in excess electrical power consumption. If the requisite voltage/dutycyle/current or feedback on valve position (directly or indirectly) may be predicted, just enough electric power may be applied to the solenoid valve to keep the solenoid valve in its energized position. For example, the current to close the solenoid valve is greater than the current to hold the solenoid valve closed. The voltage when the coil is hot (high resistance) it greater than the current required when the coil is cold (low resistance). The current required when fluid pressure tends to force open the valve increases as that pressure rises.

While it may be possible to install a position sensor on the valve, it may be more economical to feedback on indirect measures. For example, if there is a pressure difference across the valve, it may be concluded that the valve is closed. However, if the there is no pressure difference across the valve, it may not apparent if the valve is open or closed. If the purge flow rate is high (e.g., 1 liter/second), a vacuum of 3 to 5 kPa forms at the valve and a closed valve would produce a pressure differential. Without this known vacuum, the valve may be closed without a pressure differential across it.

Figure 2A:
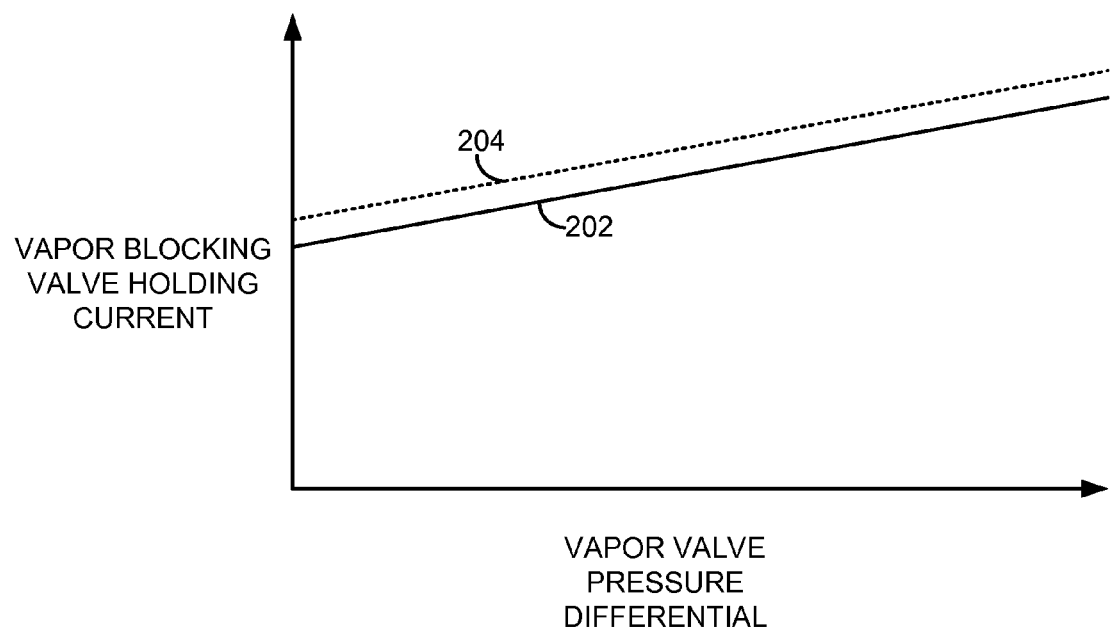
FIG. 2A shows a plot of an example fuel vapor blocking valve transfer function.
Figure 2B:
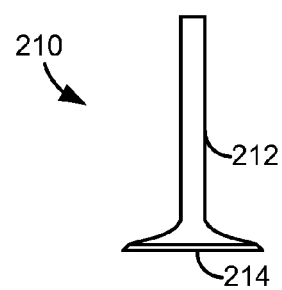
FIG. 2B shows an example poppet valve included in a fuel vapor blocking valve.

Referring now to FIG. 2A, example transfer functions for operating a vapor blocking valve are shown. The vertical axis represents vapor blocking value holding current. Holding current is increased in the direction of the vertical axis arrow. The horizontal axis represents vapor blocking valve pressure differential. The pressure differential increases in the direction of the horizontal axis arrow.

Line 202 represents a base transfer function for vapor blocking valve operation. Line 204 represents an adapted transfer function for vapor blocking valve operation. In this example, line 204 is offset from line 202 such that for a same pressure differential, additional electrical current is provided to the vapor blocking valve based on line 204 than when based on line 202. Thus, from curves 202 and 204, it may be observed that commanded vapor blocking valve electrical current is proportionate to pressure differential across the valve.

Referring now to FIG. 2B, an example poppet valve included in the vapor blocking valve 155 is shown. Poppet valve 210 includes a valve stem 212 and a valve head 214. Pressure in a fuel tank may operate on a back side of valve head 214 to close or open poppet valve 210. While the poppet valve is shown as a classic metal-to-metal seal, it is understood that this sort of valve typically employs an elastomeric seal.

Figure 3:
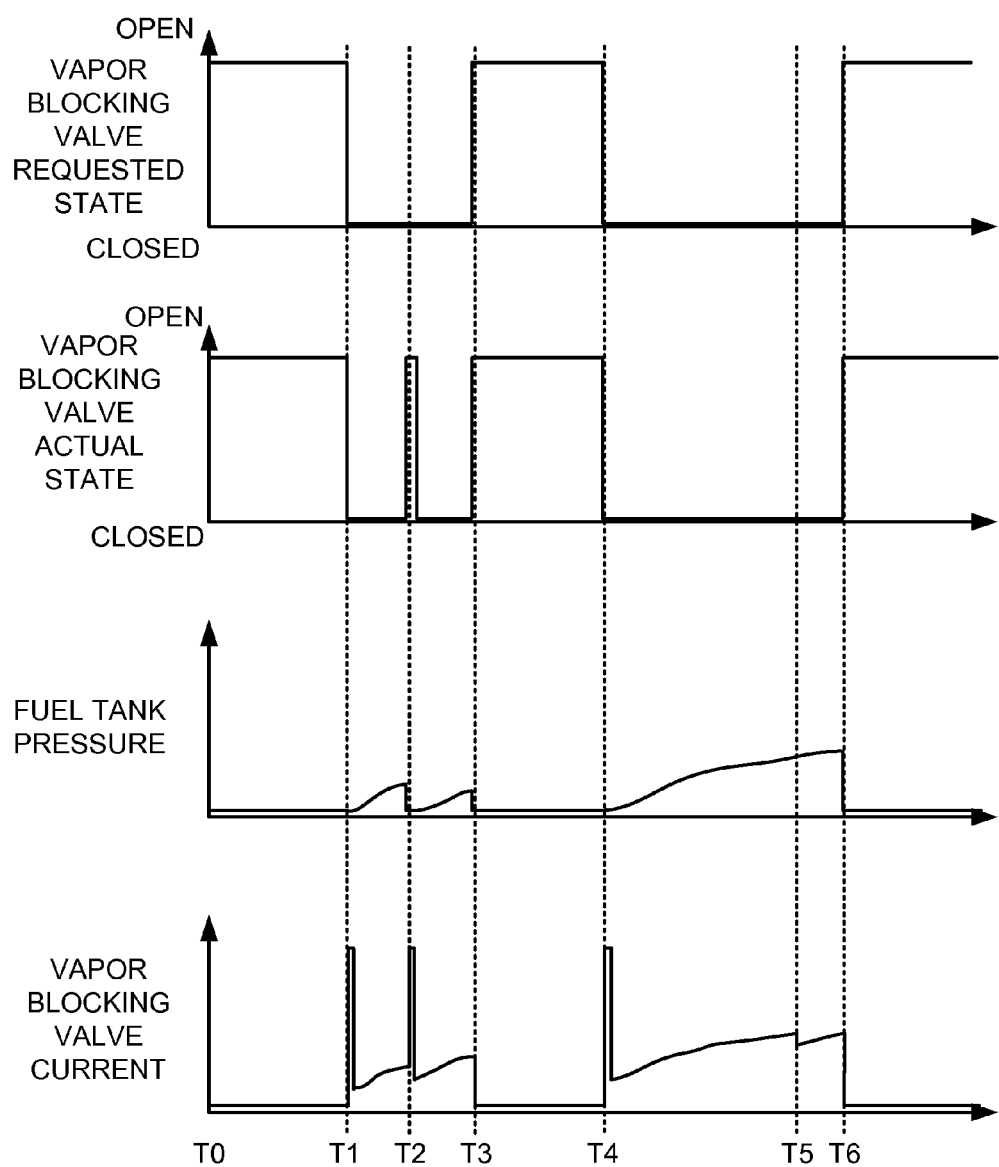
FIG. 3 shows an example operating sequence for a fuel vapor management system.

Referring now to FIG. 3, a vapor blocking valve operating sequence is shown. The vapor blocking valve operating sequence may be provided by the system of FIG. 1 according to the method of FIG. 4. Vertical lines shown at T1-T5 represent times of particular interest in the sequence. The plots are time aligned and occur at a same time.

The first plot from the top of FIG. 3 is a plot of a vapor blocking valve requested state versus time. The vertical axis represents vapor blocking valve requested operating state. The vapor blocking valve is requested closed when the trace is near the horizontal axis. The vapor blocking valve is requested open when the trace is near the vertical axis arrow. The horizontal axis represents time and time increases from the left side of the plot to the right side of the plot.

The second plot from the top of FIG. 3 is a plot of a vapor blocking valve actual state versus time. The vertical axis represents vapor blocking valve actual operating state. The vapor blocking valve is actually closed when the trace is near the horizontal axis. The vapor blocking valve is actually open when the trace is near the vertical axis arrow. The horizontal axis represents time and time increases from the left side of the plot to the right side of the plot.

The third plot from the top of FIG. 3 is a plot of fuel tank pressure versus time. The vertical axis represents fuel tank pressure and fuel tank pressure increases in the direction of the vertical axis arrow. The horizontal axis represents time and time increases from the left side of the figure to the right side of the figure.

The fourth plot from the top of FIG. 3 is a plot of vapor blocking valve commanded current versus time. The vertical axis represents commanded vapor blocking valve electrical current and commanded vapor blocking valve current increases in the direction of the vertical axis arrow. The horizontal axis represents time and time increases from the left side of the figure to the right side of the figure.

At time T0, the requested fuel vapor blocking valve state is open and the actual fuel vapor blocking valve state is open. The fuel tank pressure is at a low level (e.g., atmospheric pressure) and the fuel vapor blocking valve electrical current is zero. During such conditions, fuel vapors may flow from the fuel tank to the fuel vapor storage canister.

At time T1, the requested fuel vapor blocking valve state transitions to closed and the actual fuel vapor blocking valve state also transitions to closed following the request. The fuel vapor blocking valve may be closed during select conditions such as when the fuel vapor storage canister is being purged of fuel vapors. The fuel vapor storage canister may be purged in response to an estimated amount of fuel stored in the fuel vapor storage canister. The fuel vapor blocking valve electrical current is increased to a high level (e.g., pull-in current) to close the fuel vapor blocking valve. Shortly thereafter, the fuel vapor blocking valve electrical current is reduced to a level that is proportionate with fuel tank pressure after the fuel vapor blocking valve is closed (e.g., holding current).

Between time T1 and time T2, the fuel tank pressure increases and the fuel vapor blocking valve electrical current is increased proportionately with the fuel tank pressure. By increasing the fuel vapor blocking pressure proportionately with fuel tank pressure, the holding force to keep the vapor blocking valve closed may be increased to counteract the force applied to the fuel vapor blocking valve by the increase in fuel tank pressure. Note that if the valve were reversed in its orientation, the current would decrease with tank pressure.

At time T2, the actual fuel vapor blocking valve state transitions from closed to open in response to fuel vapor blocking valve electrical current being insufficient to hold the fuel vapor blocking valve closed while the present fuel tank pressure is applied to the fuel vapor blocking valve. The actual fuel vapor blocking valve state may be based at least in part on the fuel tank pressure. The requested fuel vapor blocking valve state remains low to request a closed vapor blocking valve. The fuel tank pressure is reduced in response to the fuel vapor blocking valve opening. Shortly thereafter, a higher pull-in current is applied to the fuel vapor blocking valve to close the valve in response to the fuel vapor blocking valve being open and the request for a closed fuel vapor blocking valve. The actual fuel vapor blocking valve changes state back to closed shortly thereafter. Additionally, the fuel vapor blocking valve transfer function is adapted at time T2 to increase the amount of electrical current supplied to the fuel vapor blocking valve to ensure the valve stays closed. The measured valve pressure differential is serving as the feedback on actual valve position. The factors affecting the solenoid valve balance include coil temperature (i.e. resistance) and other factors that are not known to the controller but may affect the solenoid force balance. The adaptation is required for the unknown factors The alternative to adaption is to supply a current large enough to accommodate worst case conditions, but this consumes more electrical power than is required for most conditions.

Between time T2 and time T3, the fuel tank pressure increases and the fuel vapor blocking valve electrical current is increased proportionately with the fuel tank pressure. The request fuel vapor blocking valve state remains closed.

At time T3, the requested fuel vapor blocking valve state transitions back to open in response to a request to purge fuel vapors from the fuel vapor storage canister (not shown). The fuel vapor blocking valve electrical current is stopped in response to the request for the fuel vapor blocking valve to be open. The actual fuel vapor blocking valve state changes from closed to open in response to the reduction in fuel vapor blocking valve electrical current.

At time T4, the requested fuel vapor blocking valve state transitions to closed and the actual fuel vapor blocking valve state also transitions to closed following the request. The fuel vapor blocking valve electrical current is increased to a high level (e.g., pull-in current) to close the fuel vapor blocking valve. Shortly thereafter, the fuel vapor blocking valve electrical current is reduced to a level that is proportionate with fuel tank pressure after the fuel vapor blocking valve is closed (e.g., holding current). The fuel vapor blocking valve electrical current proportionately follows the fuel tank pressure increase from time T4 to time T5.

At time T5, the fuel tank blocking valve has been closed for a threshold amount of time without opening. Therefore, the fuel vapor blocking valve electrical current is decreased in an effort to reduce vapor blocking valve electrical current consumption. The fuel vapor blocking valve remains in a closed state as indicated by the actual fuel vapor blocking valve state. Therefore, the fuel vapor blocking valve transfer function is adapted to provide a lower electrical current level for the fuel tank pressure observed at time T5. The fuel vapor blocking valve proportionately follows the fuel tank pressure from time T5 to time T6.

At time T6, the requested fuel vapor blocking valve state transitions back to open in response to a request to purge fuel vapors from the fuel vapor storage canister (not shown). The fuel vapor blocking valve electrical current is stopped in response to the request for the fuel vapor blocking valve to be open. The actual fuel vapor blocking valve state changes from closed to open in response to the reduction in fuel vapor blocking valve electrical current.

In this way, fuel vapor blocking valve electrical current may be reduced. Further, the fuel vapor blocking valve transfer function may be adapted or revised responsive to operating conditions indicating an open valve when a closed valve is requested.

While a current control is shown, it is understood that a duty cycled voltage control may be substituted for the current control. The required duty is computed from the supply voltage (measured) and the inferred solenoid coil resistance.

The solenoid coil is supplied with a duty cycled supply voltage computed as follows.

Duty_cycle=desired_current*inferred_coil_resistance/measured_supply_voltage.

Figure 4:
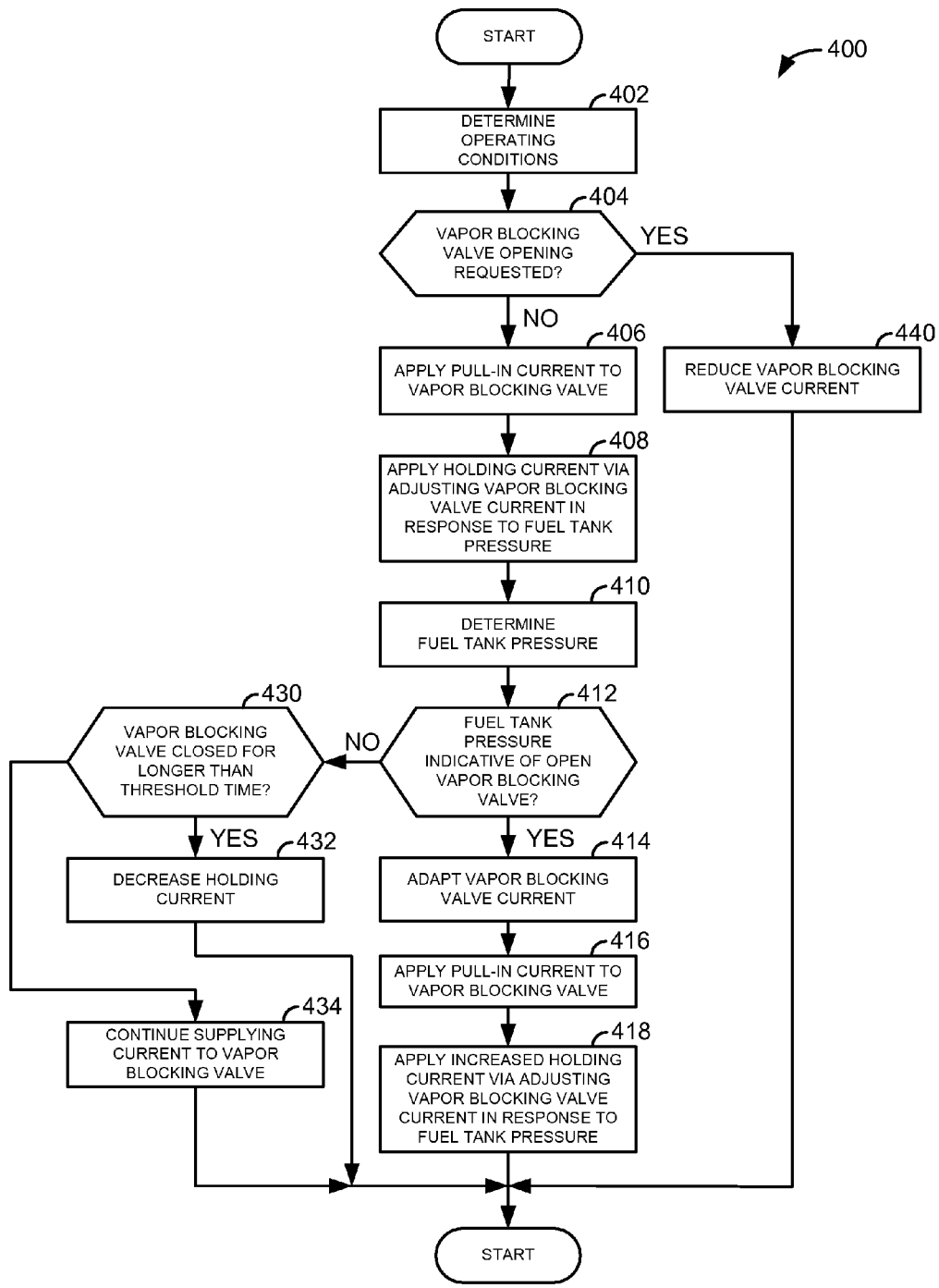
FIG. 4 shows an example method for operating a fuel vapor management system.

Referring now to FIG. 4, an example method for operating a fuel vapor blocking valve is shown. At least portions of the method of FIG. 4 may be incorporated to controller 12 in the system of FIG. 1 as executable instructions stored in non-transitory memory. Further, portions of the method of FIG. 4 may be actions taken by controller 12 in the physical world to transform vehicle operating conditions. The method of FIG. 4 may provide the operating sequence shown in FIG. 3.

At 402, method 400 determines vehicle operating conditions including but not limited to fuel tank pressure, vehicle speed, engine intake manifold pressure, and fuel vapor canister loading via receiving input to a controller via sensors. Method 400 proceeds to 404 after operating conditions are determined.

At 404, method 400 judges if fuel vapor blocking valve opening is requested. The fuel vapor blocking valve may be requested open in response to pressure in a fuel tank exceeding a threshold pressure while an amount of fuel vapors stored in the fuel vapor storage canister is less than a threshold. If method 400 judges that there is a request to close the fuel vapor blocking valve, the answer is yes and method 400 proceeds to 440. Otherwise, method 400 proceeds to 406.

At 440, method 400 decreases electrical current supplied to the fuel vapor blocking valve so that the fuel vapor blocking valve opens. By opening the fuel vapor blocking valve, fuel vapors may flow from a fuel tank to a fuel vapor storage canister. Method 400 proceeds to exit after electrical current supplied to the fuel vapor blocking valve is reduced to zero.

At 406, method 400 applies a pull-in current to the fuel vapor blocking valve to close the valve. The pull-in current is a higher electrical current than a holding current, and the pull-in current ensures that the fuel vapor blocking valve closes. In some examples, electrical current is supplied to the fuel vapor blocking valve by way of a pulse width modulated voltage signal. The pull-in current may be applied for a predetermined amount of time. Method 400 proceeds to 408 after the pull-in current has been applied to the fuel vapor blocking valve.

At 408, method 400 applies a holding current to the fuel vapor blocking valve. The holding current is a smaller electrical current than the pull-in current, and the holding current may be adjusted proportionately to fuel tank pressure. The holding current may be supplied to the fuel vapor blocking valve according to a transfer function as is shown in FIG. 2. For example, as fuel tank pressure increases, fuel vapor blocking valve electrical current may be increased. The holding current is applied to a closed fuel vapor blocking valve or a commanded closed fuel vapor blocking valve. Method 400 proceeds to 410 after the holding current is applied to the fuel vapor blocking valve and adjusted responsive to fuel tank pressure.

At 410, method 400 determined fuel tank pressure. The fuel tank pressure may be determined via a pressure sensor and input to a controller. Method 400 proceeds to 412 after fuel tank pressure is determined.

At 412, method 400 judges if fuel tank fuel pressure is indicative of an open fuel vapor blocking valve. In one example, method 400 judges that the fuel vapor blocking valve is open if fuel tank pressure is within a threshold pressure of atmospheric pressure (e.g., within 10 kPa of atmospheric pressure). In another example, method 400 judges that the fuel vapor blocking valve is open if fuel tank pressure rate of change is greater than a threshold value. In still another example, method 400 filters fuel tank pressure with a first low pass filter having a first time constant. Method 400 filters fuel tank pressure with a second low pass filter having a second time constant different from the first time constant. If output of the first filter is different from output of the second filter by a predetermined amount, method 400 judges that the fuel vapor blocking valve is open. If method 400 judges that the fuel vapor blocking valve is open when it is requested closed, the answer is yes and method 400 proceeds to 414. Otherwise, the answer is no and method 400 proceeds to 430.

At 430, method 400 judges if the fuel vapor blocking valve has been closed for more than a predetermined amount of time. If the fuel vapor blocking valve is closed for more than a predetermined amount of time, it may be indicative of fuel vapor blocking valve electrical current being greater than is desired. If method 400 judges that the fuel vapor blocking valve has been closed for more than a predetermined amount of time, the answer is yes and method 400 proceeds to 432. Otherwise, method 400 continues to 434.

At 432, method 400 decreases holding current supplied to the fuel vapor blocking valve. The holding current may be decreased by a predetermined amount. If the fuel vapor blocking valve remains closed at the same fuel tank pressure and the new electrical current level, the fuel vapor blocking valve transfer function is updated with the new electrical current applied to the vapor blocking valve for the present fuel tank pressure. If the fuel vapor blocking valve opens, the fuel vapor blocking valve is closed and the fuel vapor blocking valve transfer function is not updated. Method 400 proceeds to exit after decreasing the fuel vapor blocking valve electrical current.

At 434, method 400 continues to supply the fuel vapor blocking valve at the present level. Further, the fuel vapor blocking valve transfer function is not adapted or revised.

At 414, method 400 adapts the fuel vapor blocking valve transfer function by increasing an electrical current value for the present fuel tank pressure. The transfer function value output is used to provide the holding current. The current value in the transfer function corresponding to the present fuel tank pressure is increased to increase force applied to hold the vapor blocking valve closed. The increase in force operates to counter act fuel tank pressure. Method 400 proceeds to 416 after the transfer function is adapted.

At 416, method 400 applies a pull-in current to close the fuel vapor blocking valve. The pull-in current may be provided for a predetermined amount of time before holding current is applied to the fuel vapor blocking valve. Method 400 proceeds to 418 after the pull-in current is applied.

At 418, method 400 applies the adapted fuel vapor valve transfer function to provide holding current to the fuel vapor blocking valve. The changed transfer function may operate to increase a duty cycle of a pulse width modulated voltage to increase electrical current flow to the fuel vapor blocking valve. The fuel vapor blocking valve electrical current is adjusted proportionately with fuel tank pressure. Method 400 proceeds to exit after the holding current is applied to the fuel vapor blocking valve.

In this way, operation of the fuel vapor blocking valve may be adjusted to reduce electrical current consumption. Further, the fuel vapor blocking valve current adapts for conditions that may provide increased electrical current consumption or decreased electrical current consumption (e.g., changes in ambient temperature and blocking valve temperature).

Thus, the method of FIG. 4 provides for a vapor blocking valve control method, comprising: receiving sensor input to a controller; proportionately adjusting a vapor blocking valve holding current command for a closed vapor blocking valve based on a fuel tank pressure via the controller; and supplying current to a vapor blocking valve in response to the vapor blocking valve current command. The method includes where the vapor blocking valve current command is a function of the fuel tank pressure. The method includes where the vapor blocking valve includes a poppet valve. The method includes where adjusting the vapor blocking valve current command includes reducing the vapor blocking valve current command in response to a decrease in the fuel tank pressure when the fuel tank pressure is positive.

In some examples, the method includes where adjusting the vapor blocking valve current command includes increasing the vapor blocking valve current command in response to an increase in the fuel tank pressure when the fuel tank pressure is positive. The method further comprises adapting a vapor blocking valve transfer function. The method includes where the vapor blocking valve transfer function describes a vapor blocking valve current as a function of fuel tank pressure.

The method of FIG. 4 also provides for a vapor blocking valve control method, comprising: receiving sensor input to a controller; proportionately adjusting a vapor blocking valve current command for a closed vapor blocking valve based on a fuel tank pressure via the controller; supplying current to a vapor blocking valve in response to the vapor blocking valve current command; and adapting a transfer function via the controller in response to an indication of vapor blocking valve opening when the vapor blocking valve is commanded closed. The method includes where the transfer function is a vapor blocking valve transfer function. The method includes where the vapor blocking valve transfer function describes vapor blocking valve current as a function of fuel tank pressure.

In some examples, the method includes where the vapor blocking valve current command is a holding current command, and where the holding current command is a current command applied to a closed vapor blocking valve to reduce current consumption. The method further comprises adapting the transfer function to reduce the vapor blocking valve current command in response to an absence of vapor blocking valve opening. The method includes where the indication of vapor blocking valve opening is a fuel tank pressure within a threshold pressure of atmospheric pressure. The method includes where the indication of vapor blocking valve opening is a fuel tank pressure rate of change greater than a threshold rate of change.

As will be appreciated by one of ordinary skill in the art, the methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. In addition, the terms aspirator or venturi may be substituted for ejector since the devices may perform in a similar manner.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A vapor blocking valve control method, comprising:
receiving sensor input to a controller;
adjusting a vapor blocking valve holding current for a vapor blocking valve that is closed based on a fuel tank pressure via the controller; and
adjusting a value of a vapor blocking valve transfer function and supplying a pull-in current to the vapor blocking valve when the vapor blocking valve holding current fails to hold the vapor blocking valve closed.

2. The method of claim 1, where the vapor blocking valve holding current is a function of the fuel tank pressure.

3. The method of claim 1, where the vapor blocking valve includes a poppet valve.

4. The method of claim 1, where adjusting the vapor blocking valve holding current includes reducing the vapor blocking valve holding current in response to a decrease in the fuel tank pressure when the fuel tank pressure is positive.

5. The method of claim 1, where adjusting the vapor blocking valve holding current includes increasing the vapor blocking valve holding current in response to an increase in the fuel tank pressure when the fuel tank pressure is positive.

6. The method of claim 1, where the value corresponds to the vapor blocking valve holding current.

7. The method of claim 6, where the vapor blocking valve transfer function describes a vapor blocking valve current as a function of fuel tank pressure.

8. A vapor blocking valve control method, comprising:
receiving sensor input to a controller;
proportionately adjusting a vapor blocking valve current for a closed vapor blocking valve based on a fuel tank pressure via the controller;
supplying current to a vapor blocking valve in response to the vapor blocking valve current; and
adapting a transfer function via the controller in response to an indication of vapor blocking valve opening when the vapor blocking valve is commanded closed.

9. The method of claim 8, where the transfer function is a vapor blocking valve transfer function.

10. The method of claim 9, where the vapor blocking valve transfer function describes vapor blocking valve current as a function of the fuel tank pressure.

11. The method of claim 8, where the vapor blocking valve current is a holding current, and where the holding current is a current applied to the closed vapor blocking valve to reduce current consumption.

12. The method of claim 8, further comprising adapting a value of the transfer function to reduce the vapor blocking valve current in response to an absence of vapor blocking valve opening.

13. The method of claim 8, where the indication of vapor blocking valve opening is a fuel tank pressure within a threshold pressure of atmospheric pressure.

14. The method of claim 8, where the indication of vapor blocking valve opening is a fuel tank pressure rate of change greater than a threshold rate of change.

15. A fuel vapor purging system, comprising:
a fuel vapor storage canister including activated carbon;
a fuel tank;
a vapor blocking valve positioned along a passage between the fuel tank and the fuel vapor storage canister; and
a controller including executable instructions stored in non-transitory memory to proportionately adjust current supplied to the vapor blocking valve based on fuel tank pressure when the vapor blocking valve is commanded closed, and additional instructions to determine the vapor blocking valve is open responsive to output of two filters having different time constants.

16. The system of claim 15, further comprising additional instructions to determine the vapor blocking valve is open when commanded closed based on a rate of fuel tank pressure change greater than a threshold rate of change.

17. The system of claim 15, further comprising additional instructions to reduce vapor blocking valve current in response to no indication of an open vapor blocking valve after a predetermined time since commanding the vapor blocking valve closed.

18. The system of claim 17, further comprising additional instructions to determine the vapor blocking valve is open in response to the fuel tank pressure being within a threshold pressure of atmospheric pressure.

19. The system of claim 15, further comprising additional instructions to adapt a vapor blocking valve transfer function via changing a value of the vapor blocking valve transfer function.

* * * * *